US011598216B2

(12) United States Patent
Gallier et al.

(10) Patent No.: US 11,598,216 B2
(45) Date of Patent: Mar. 7, 2023

(54) CERAMIC MATRIX COMPOSITE AIRFOIL COOLING

(71) Applicant: General Electric Company, Schenectady, NY (US)

(72) Inventors: Kirk Douglas Gallier, Liberty Township, OH (US); Darrell Glenn Senile, Oxford, OH (US); John Calhoun, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 637 days.

(21) Appl. No.: 16/700,017

(22) Filed: Dec. 2, 2019

(65) Prior Publication Data

US 2020/0332666 A1 Oct. 22, 2020

Related U.S. Application Data

(63) Continuation of application No. 15/151,860, filed on May 11, 2016, now Pat. No. 10,605,095.

(51) Int. Cl.
*F01D 5/18* (2006.01)
*F01D 5/14* (2006.01)
(Continued)

(52) U.S. Cl.
CPC .......... *F01D 5/187* (2013.01); *B28B 23/0068* (2013.01); *B32B 37/142* (2013.01);
(Continued)

(58) Field of Classification Search
CPC .......... F01D 5/187; F01D 5/147; F01D 5/284; F01D 5/288; F01D 5/18; F01D 9/041;
(Continued)

(56) References Cited

U.S. PATENT DOCUMENTS 3,111,302 A * 11/1963 Bowmer .................. F01D 5/18 416/97 R
4,601,638 A ‡ 7/1986 Hill ........................ F01D 5/186 415/11

(Continued)

FOREIGN PATENT DOCUMENTS

CN 104420893 A 3/2015
EP 1367223 A1 12/2003

OTHER PUBLICATIONS

Chinese Patent Office, Office Action re Corresponding Application No. 201780028748.4, dated Sep. 29, 2020, 8 pages, China.

*Primary Examiner* — Francisco W Tschen
*Assistant Examiner* — Abhishek A Patwardhan
(74) *Attorney, Agent, or Firm* — McGarry Bair PC

(57) ABSTRACT

Airfoils for gas turbine engines are provided. In one embodiment, an airfoil formed from a ceramic matrix composite material includes opposite pressure and suction sides extending radially along a span and defining an outer surface of the airfoil. The airfoil also includes opposite leading and trailing edges extending radially along the span. The pressure and suction sides extend axially between the leading and trailing edges. The leading edge defines a forward end of the airfoil, and the trailing edge defining an aft end of the airfoil. Further, the airfoil includes a trailing edge portion defined adjacent the trailing edge at the aft end of the airfoil; a plenum defined within the airfoil forward of the trailing edge portion; and a cooling passage defined within the trailing edge portion proximate the suction side. Methods for forming airfoils for gas turbine engines also are provided.

16 Claims, 10 Drawing Sheets

(51) Int. Cl.

| | |
|---|---|
| ***F01D 5/28*** | (2006.01) |
| ***B28B 23/00*** | (2006.01) |
| ***B32B 37/14*** | (2006.01) |
| ***B32B 38/10*** | (2006.01) |
| ***B32B 38/08*** | (2006.01) |
| ***B32B 38/00*** | (2006.01) |
| ***F01D 9/04*** | (2006.01) |
| ***F01D 25/00*** | (2006.01) |
| ***F01D 25/12*** | (2006.01) |

(52) U.S. Cl.
CPC .............. *B32B 38/10* (2013.01); *F01D 5/147* (2013.01); *F01D 5/284* (2013.01); *F01D 5/288* (2013.01); *B32B 38/0036* (2013.01); *B32B 38/08* (2013.01); *B32B 2305/80* (2013.01); *B32B 2315/02* (2013.01); *F01D 5/18* (2013.01); *F01D 9/041* (2013.01); *F01D 25/005* (2013.01); *F01D 25/12* (2013.01); *F05D 2220/32* (2013.01); *F05D 2230/50* (2013.01); *F05D 2230/90* (2013.01); *F05D 2260/202* (2013.01); *F05D 2260/204* (2013.01); *F05D 2300/6033* (2013.01); *F05D 2300/611* (2013.01); *Y02T 50/60* (2013.01)

(58) Field of Classification Search
CPC ... F01D 25/005; F01D 25/12; B28B 23/0068; B32B 37/142; B32B 38/10; B32B 38/0036; B32B 38/08; B32B 2305/80; B32B 2315/02; F05D 2220/32; F05D 2230/50; F05D 2230/90; F05D 2260/202; F05D 2260/204; F05D 2300/6033; F05D 2300/611; Y02T 50/60
See application file for complete search history.

(56) References Cited

U.S. PATENT DOCUMENTS 4,770,608 A * 9/1988 Anderson ............... F01D 5/186 415/115
5,102,299 A * 4/1992 Frederick ................ F01D 5/186 415/115
5,243,759 A * 9/1993 Brown .................... B23P 15/02 29/889.7
5,584,652 A * 12/1996 Shaffer ................... F01D 9/042 415/137
5,640,767 A * 6/1997 Jackson .................... F01D 5/18 29/527.4
6,004,100 A * 12/1999 Przirembel ............. F01D 5/187 416/97 R
6,190,120 B1 * 2/2001 Thatcher ................. F01D 5/187 415/115
6,241,466 B1 * 6/2001 Tung ....................... F01D 5/187 415/115
6,499,949 B2 * 12/2002 Schafrik ................. F01D 5/187 416/97 R
7,093,359 B2 * 8/2006 Morrison ................ F01D 5/284 264/257
7,334,992 B2 ‡ 2/2008 Downs ................... F01D 5/186 416/97
7,780,415 B2 * 8/2010 Liang ...................... F01D 5/186 415/115
7,854,591 B2 * 12/2010 Liang ...................... F01D 5/187 415/115
7,887,300 B2 ‡ 2/2011 Mazzola ................. F01D 5/147 416/22
7,980,821 B1 * 7/2011 Liang ...................... F01D 5/187 416/97 R
8,070,454 B1 * 12/2011 Rawlings ................ F01D 5/288 416/228
8,079,813 B2 * 12/2011 Liang ...................... F01D 5/187 416/97 R
8,096,770 B2 * 1/2012 Liang ...................... F01D 5/186 415/115
8,202,054 B2 * 6/2012 Liang ...................... F01D 5/188 416/97 R
8,215,900 B2 ‡ 7/2012 Morrison .............. B22D 19/04 415/11
8,807,944 B2 8/2014 Itzel
8,827,646 B2 * 9/2014 Hada ....................... F01D 5/187 416/92
8,967,961 B2 3/2015 McCaffrey
2003/0223861 A1 * 12/2003 Morrison ................ F01D 5/282 415/115
2005/0238491 A1 * 10/2005 Morrison ................ F01D 5/187 416/229 R
2006/0226290 A1 * 10/2006 Campbell ............... F01D 5/146 244/123.1
2008/0080979 A1 * 4/2008 Brassfield ................. F01D 5/18 416/97 R
2008/0124512 A1 * 5/2008 Steibel ................... F01D 5/282 428/105
2008/0203236 A1 * 8/2008 Mazzola ................. F01D 5/147 244/35 R
2009/0165924 A1 * 7/2009 Steibel .................... F01D 5/147 156/89.11
2013/0272850 A1 * 10/2013 Bunker ................... F01D 5/189 29/888
2014/0193577 A1 * 7/2014 Monaghan ............ C04B 35/565 264/258
2014/0271153 A1 * 9/2014 Uskert .................... F01D 5/187 415/177
2014/0302278 A1 * 10/2014 Bunker .................... B05D 3/14 428/137
2015/0064019 A1 3/2015 Lacy et al.
2017/0101893 A1 * 4/2017 Marsh ....................... F01D 5/18
2017/0254206 A1 ‡ 9/2017 Schetzel ................. F01D 5/147

* cited by examiner
‡ imported from a related application

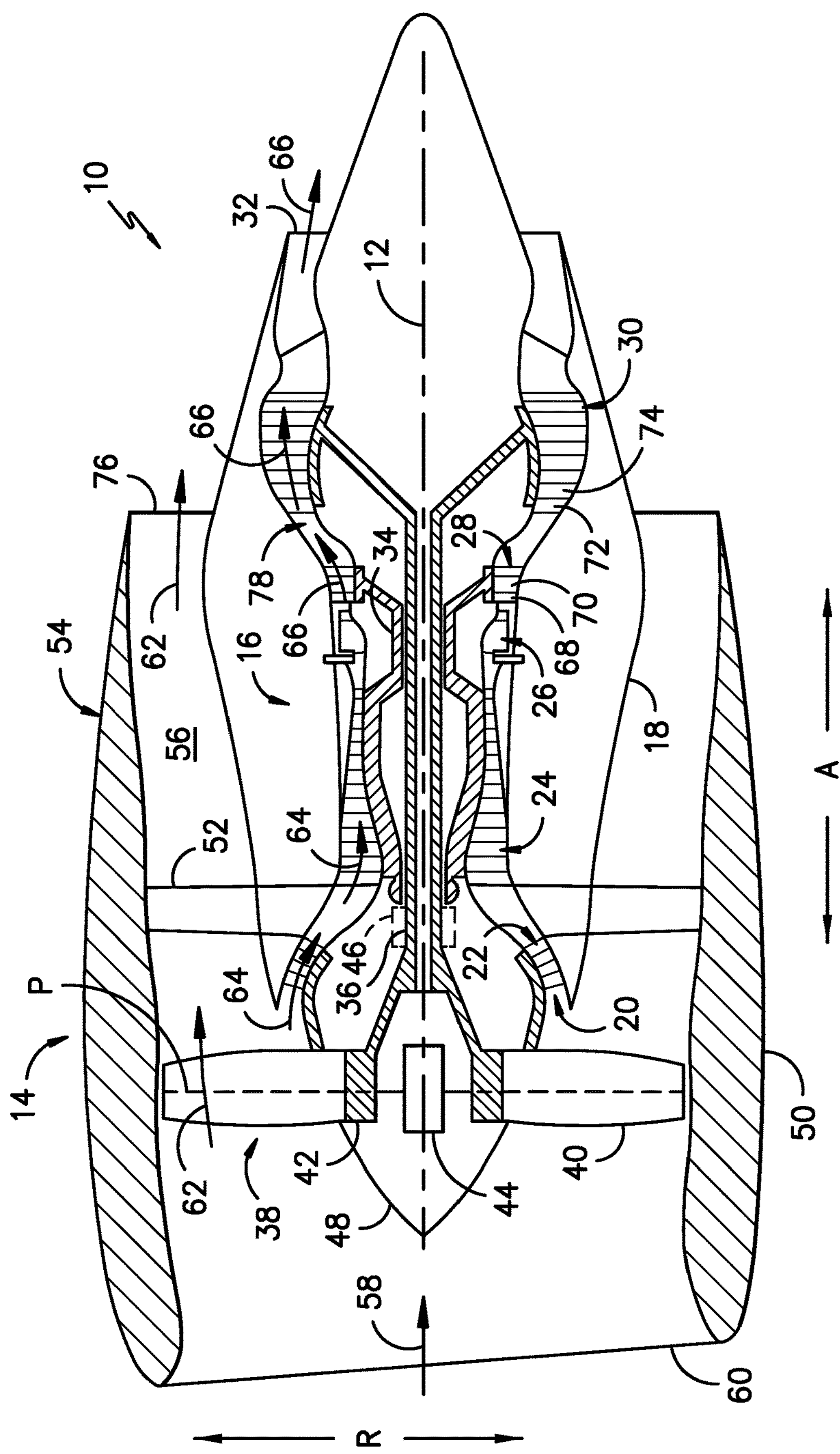
FIG. -1-

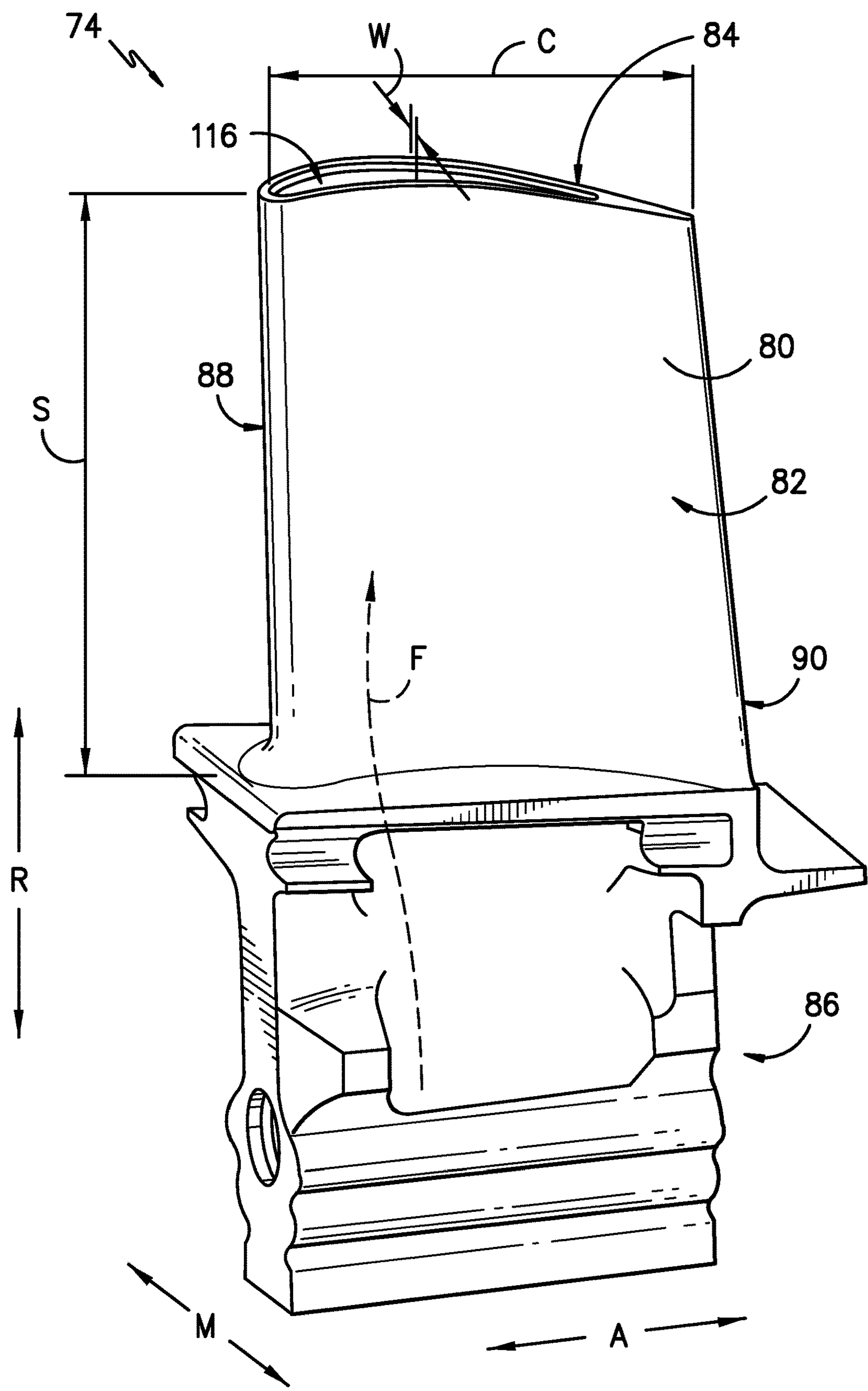
FIG. -2-

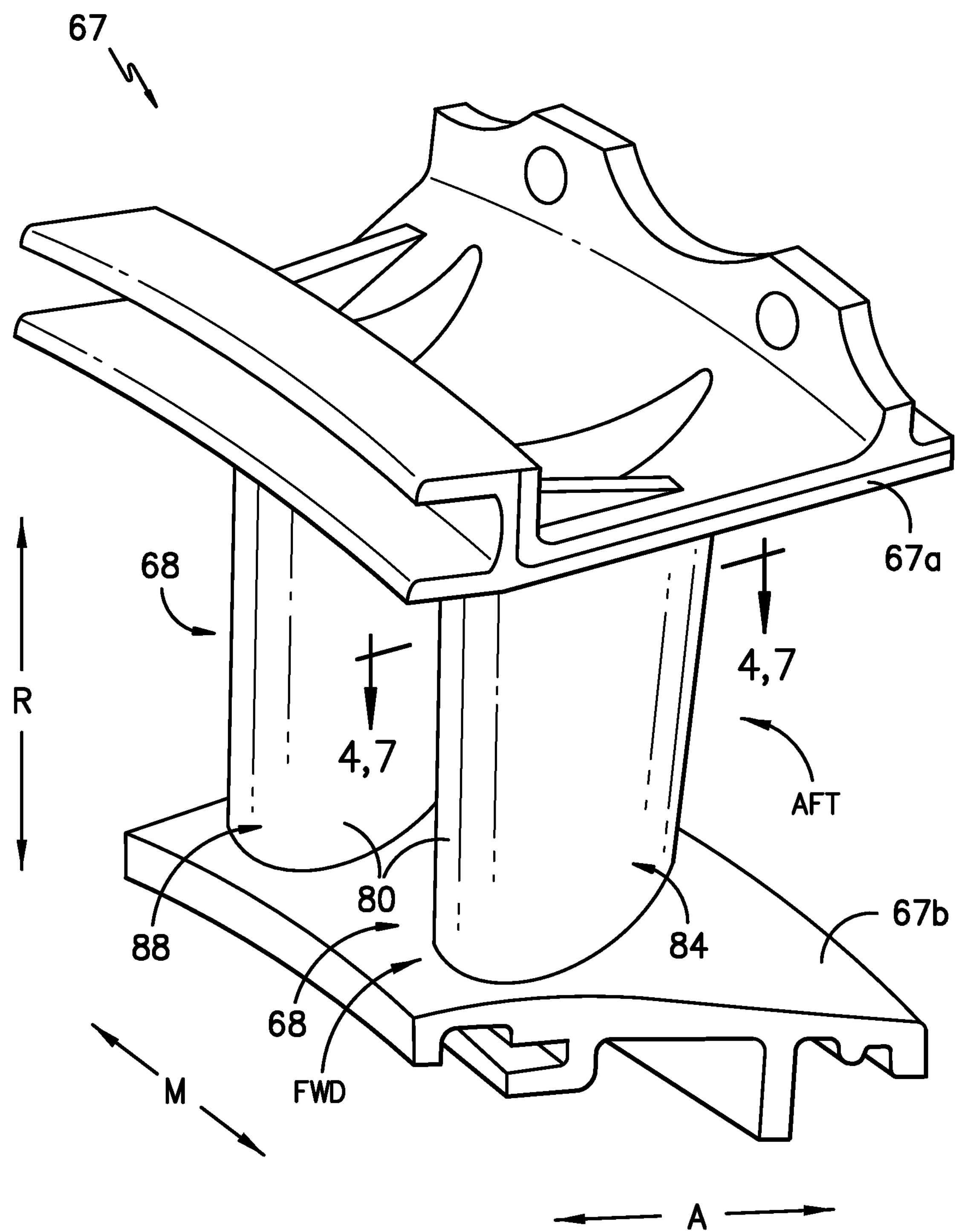
*FIG. -3-*

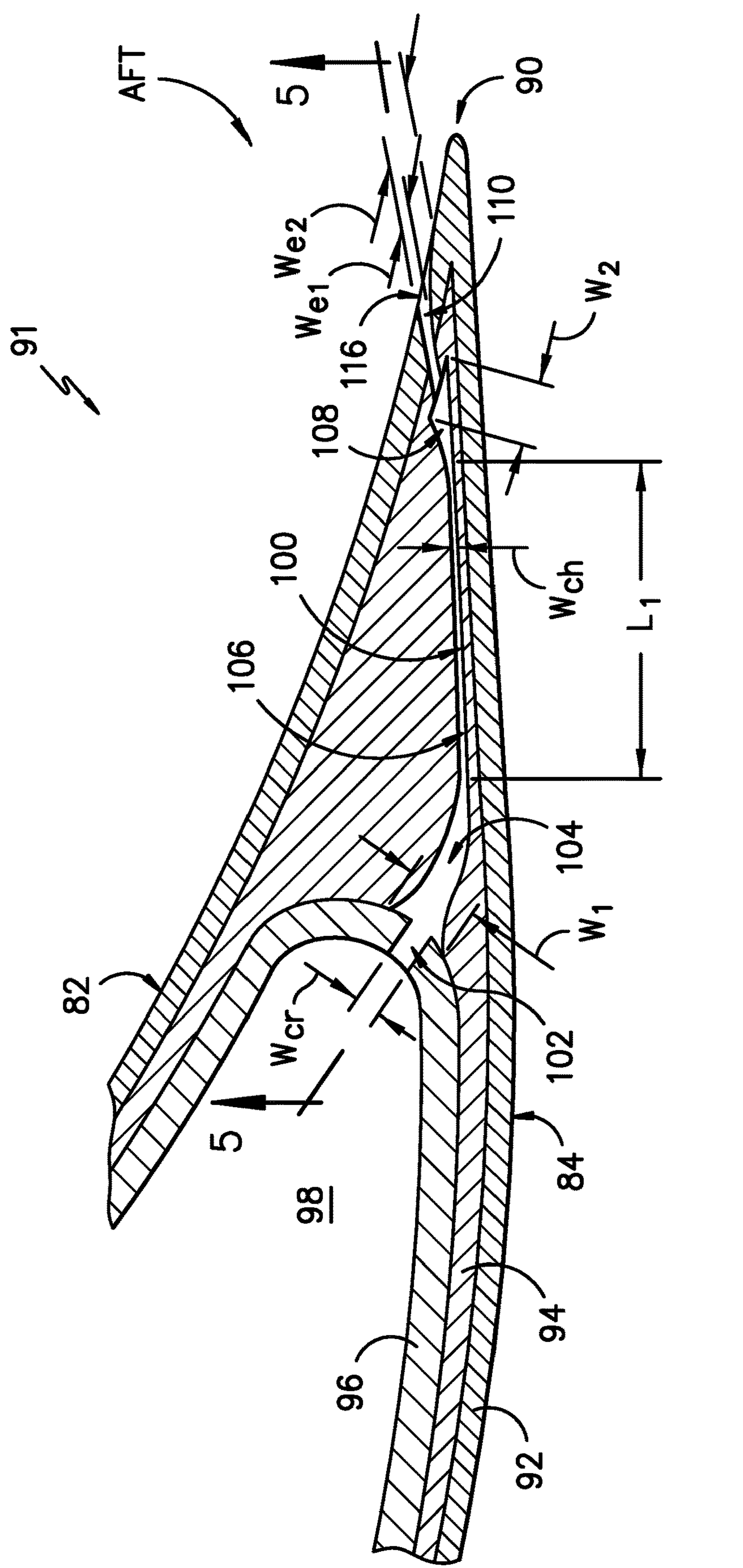
FIG. -4-

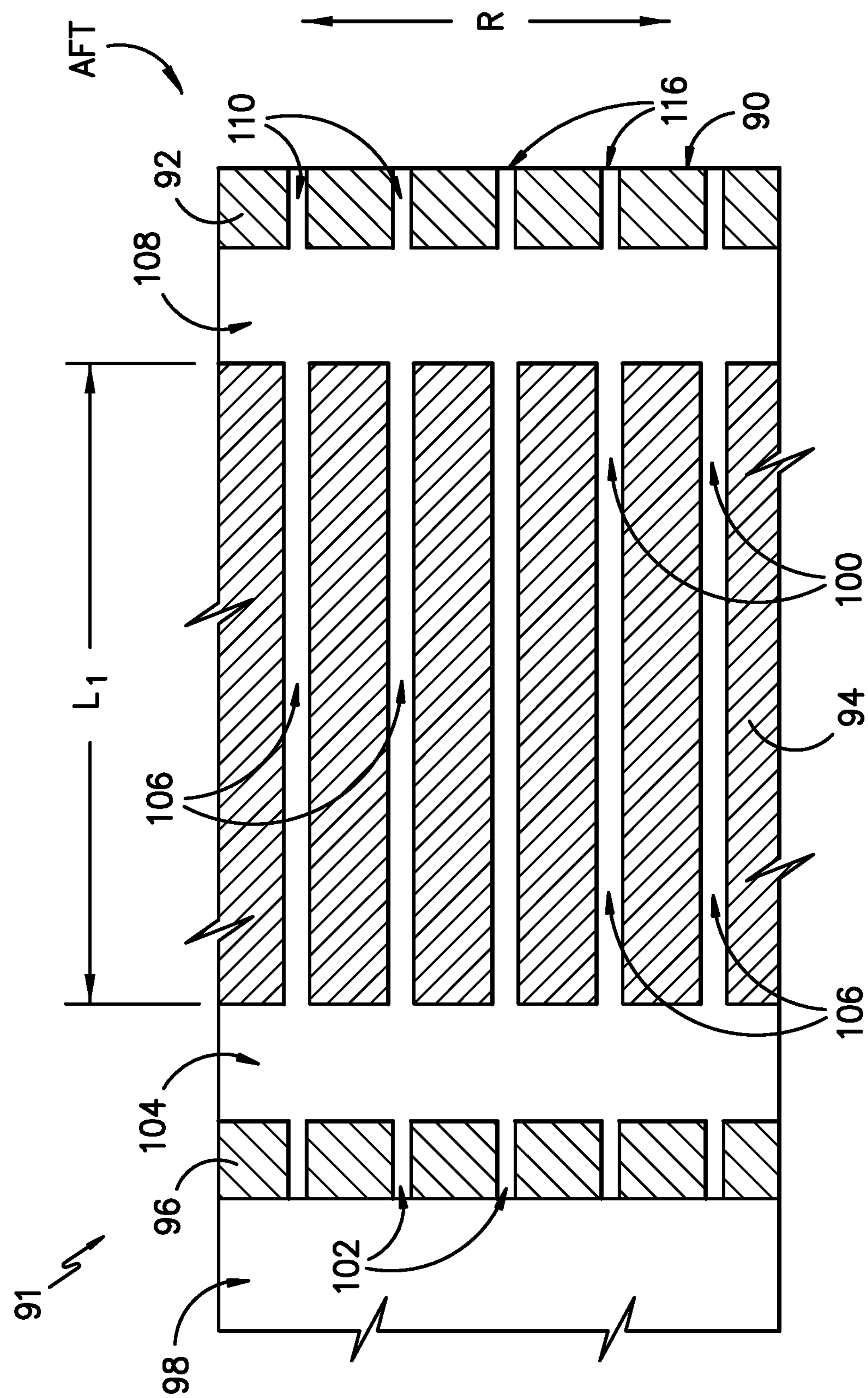
FIG. –5–

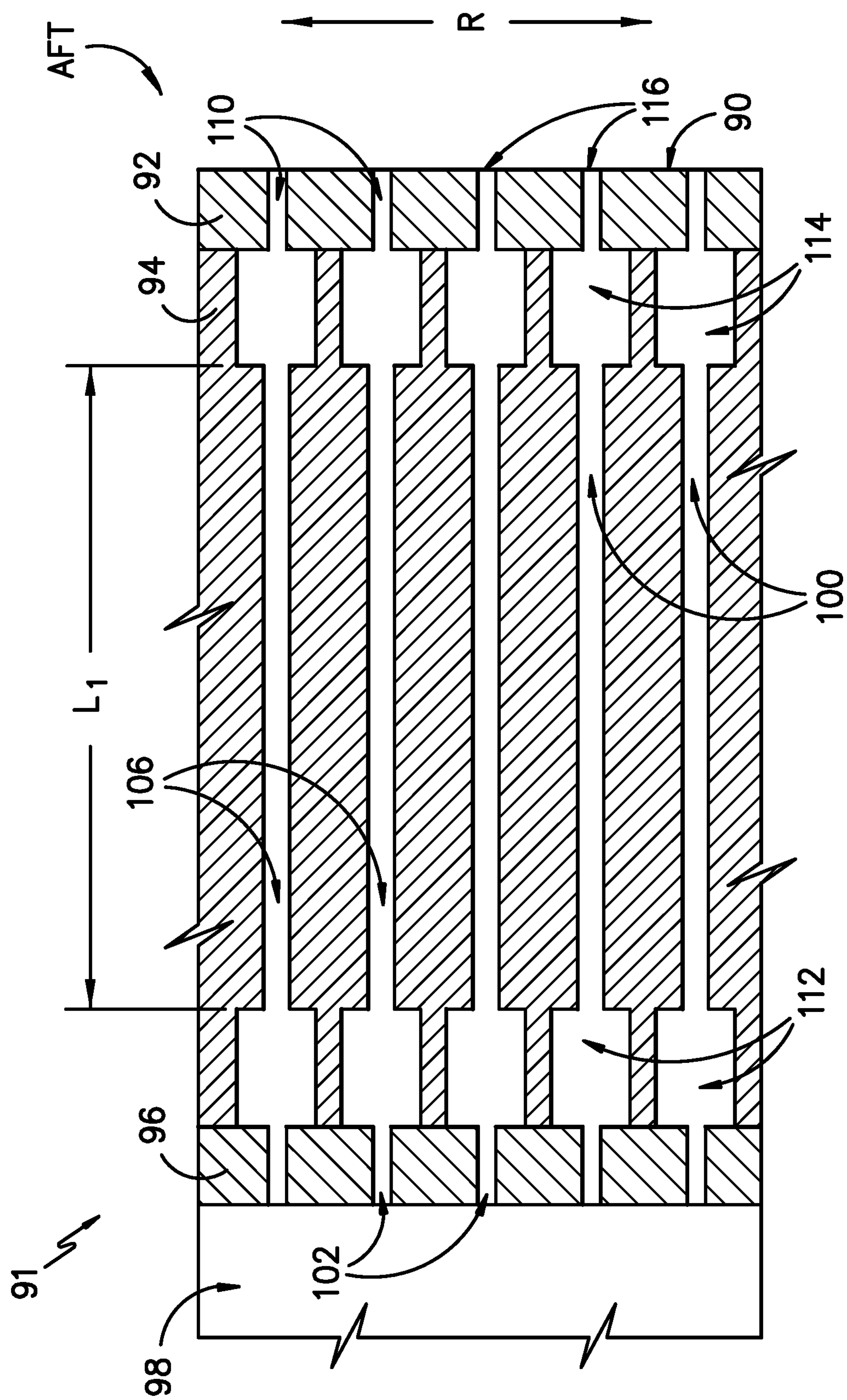
FIG. –6–

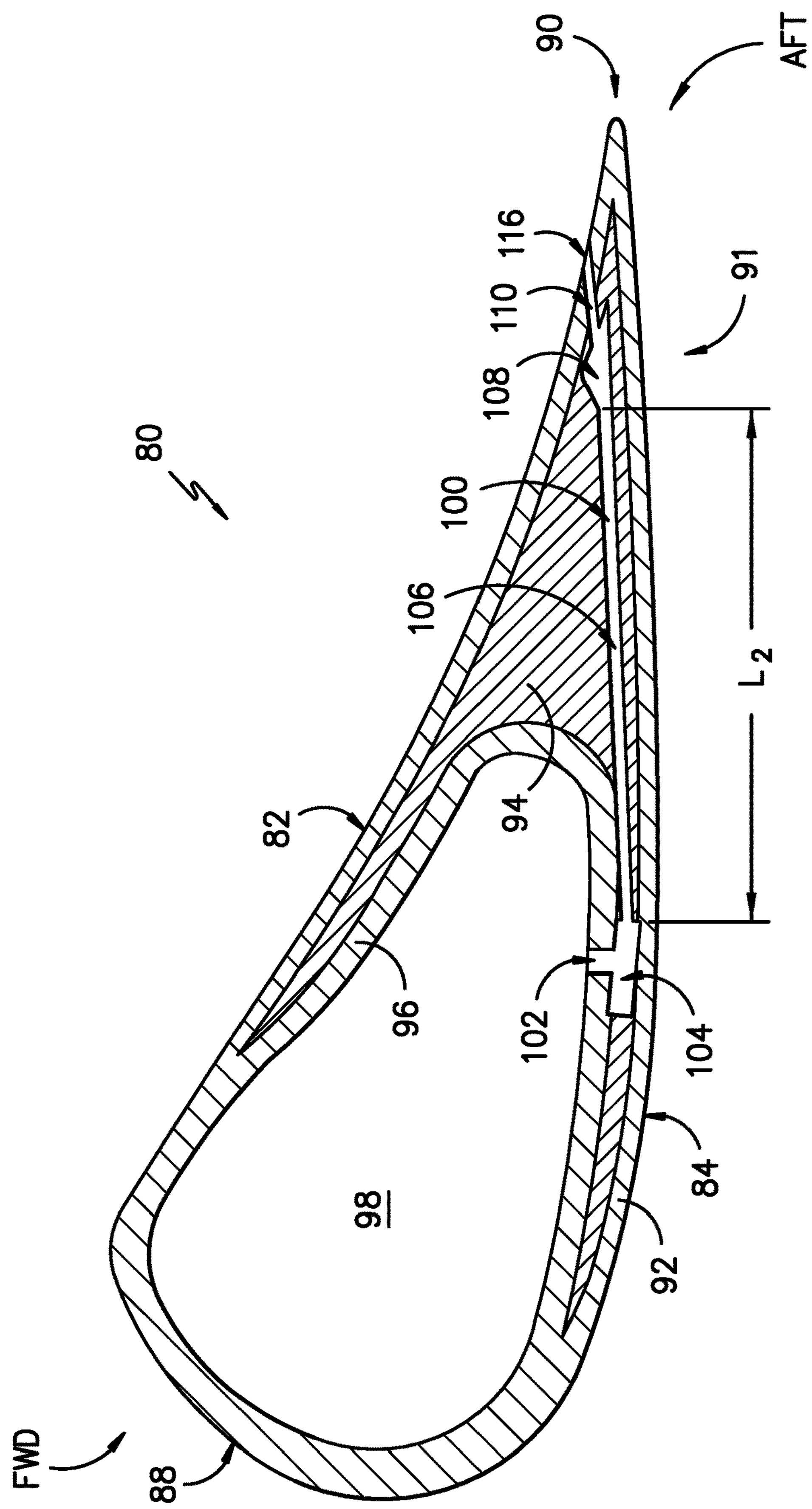
FIG. -7-

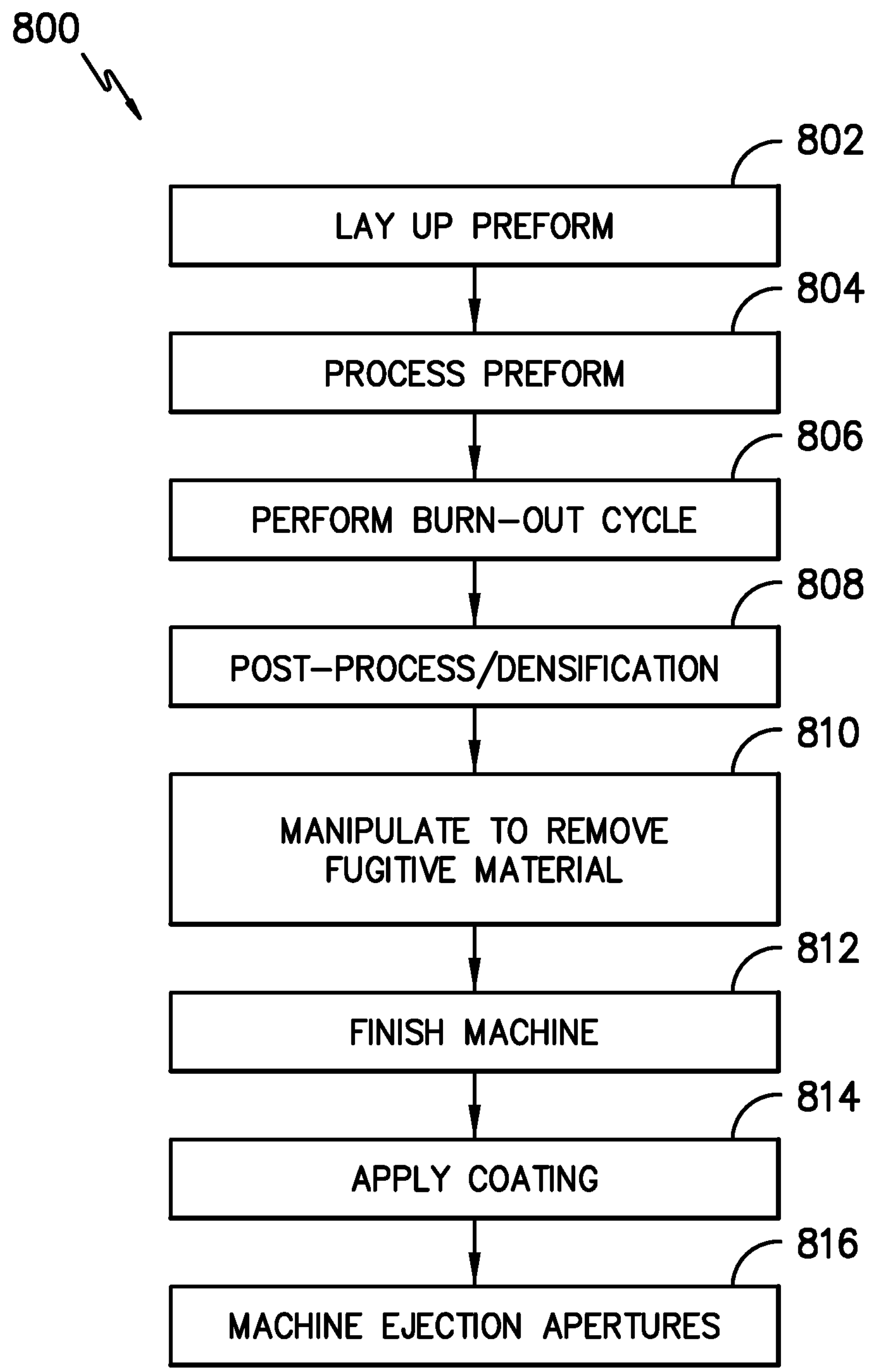
FIG. -8-

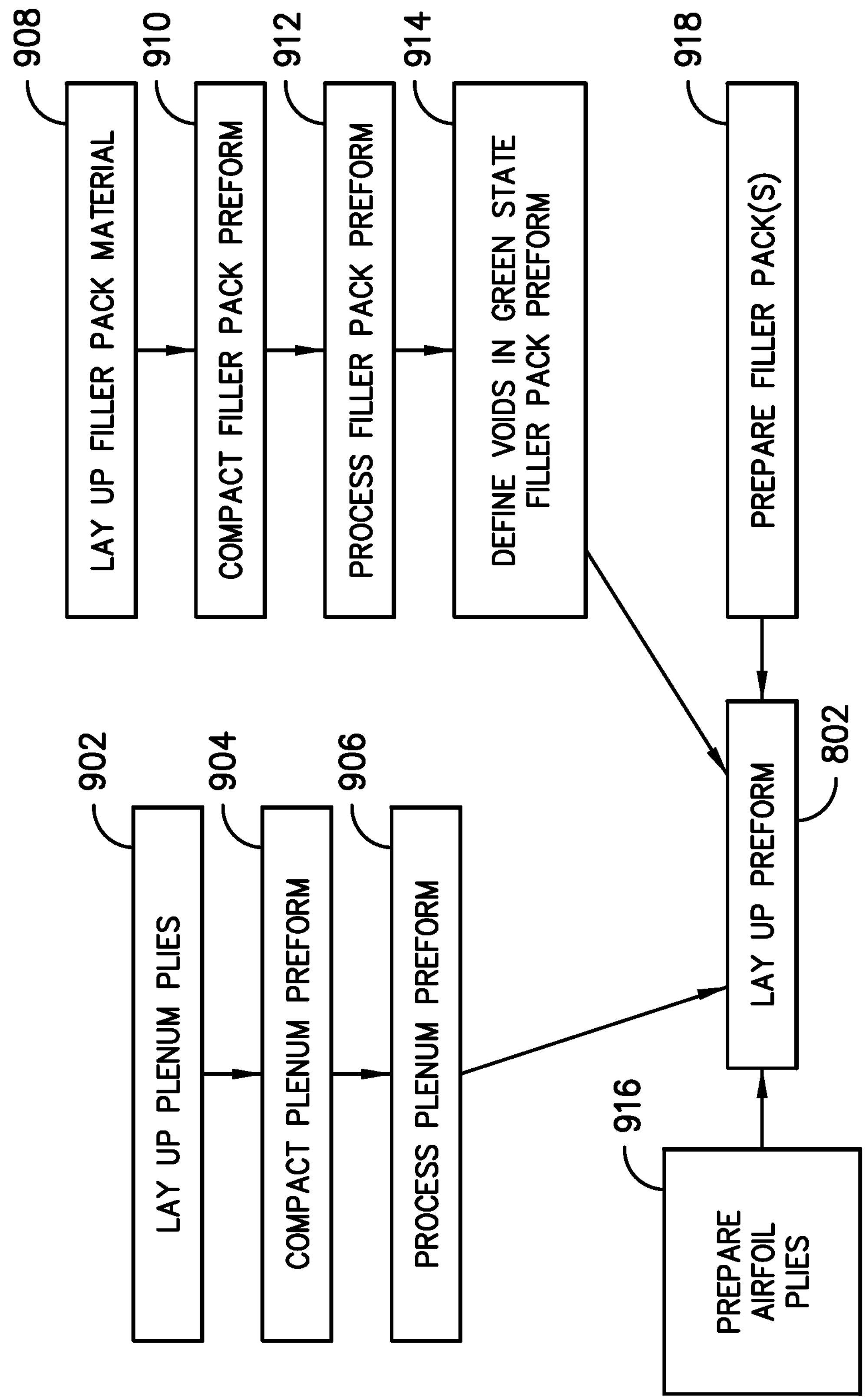
FIG. –9–

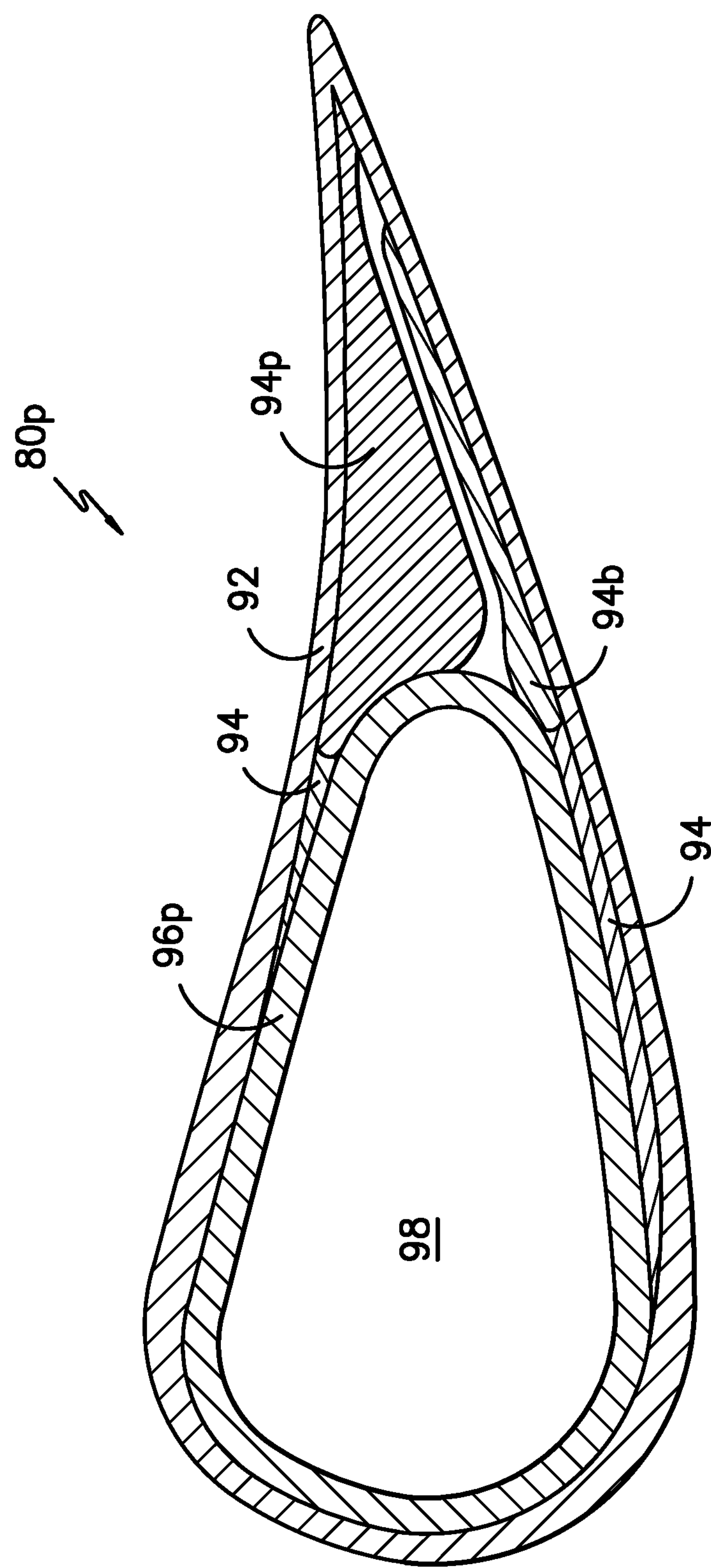
FIG. –10–

CERAMIC MATRIX COMPOSITE AIRFOIL COOLING

CROSS-REFERENCE TO RELATED APPLICATIONS

This application is a continuation of and claims priority to U.S. application Ser. No. 15/151,860, filed May 11, 2016, now issued as U.S. Pat. No. 10,605,095, the contents of which are incorporated herein by reference.

FIELD OF THE INVENTION

The present subject matter relates generally to a gas turbine engine, or more particularly to features for cooling internal components of gas turbine engines. Most particularly, the present subject matter relates to trailing edge cooling for gas turbine engine airfoils.

BACKGROUND OF THE INVENTION

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

In general, turbine performance and efficiency may be improved by increased combustion gas temperatures. However, increased combustion temperatures can negatively impact the gas turbine engine components, for example, by increasing the likelihood of material failures. Thus, while increased combustion temperatures can be beneficial to turbine performance, some components of the gas turbine engine may require cooling features or reduced exposure to the combustion gases to decrease the negative impacts of the increased temperatures on the components.

Film cooling gas turbine engine components, e.g., by directing a flow of cooler fluid over the surface of the component, can help reduce the negative impacts of elevated combustion temperatures. For example, cooling apertures may be provided throughout a component that allow a flow of cooling fluid from within the component to be directed over the outer surface of the component. However, multiple rows of cooling holes often are required to achieve beneficial film cooling, and the multiple rows of cooling holes can be detrimental to the component structure as well as engine performance. Also, typical drilling processes for defining the cooling holes require increased component thicknesses to accommodate tolerances in drill hole placement, thereby increasing the weight of and material required to produce the component. Further, known cooling hole configurations often have only a single solution for metering the flow of cooling fluid.

Therefore, improved cooling features for gas turbine components that overcome one or more disadvantages of existing cooling features would be desirable. In particular, an airfoil for a gas turbine engine having trailing edge cooling features that minimize a thickness of a trailing edge portion of the airfoil would be beneficial. Moreover, an airfoil for a gas turbine engine having trailing edge cooling features that reduce cooling flow would be desirable. Further, an airfoil having trailing edge cooling features that minimize or reduce manufacturing time and cost would be advantageous. Also, an airfoil having trailing edge cooling features that provide bore cooling close to a suction side of the airfoil would be beneficial. Additionally, a method for forming an airfoil for a gas turbine engine where the airfoil has features for improved trailing edge cooling would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an airfoil for a gas turbine engine is provided. The airfoil includes opposite pressure and suction sides extending radially along a span; the pressure and suction sides define an outer surface of the airfoil. The airfoil also includes opposite leading and trailing edges extending radially along the span. The pressure and suction sides extend axially between the leading and trailing edges. The leading edge defines a forward end of the airfoil, and the trailing edge defining an aft end of the airfoil. Further, the airfoil includes a trailing edge portion defined adjacent the trailing edge at the aft end of the airfoil; a plenum defined within the airfoil forward of the trailing edge portion; and a cooling passage defined within the trailing edge portion for directing a cooling fluid from the plenum to the outer surface of the airfoil. The cooling passage is defined proximate the suction side. The airfoil is formed from a ceramic matrix composite material.

In another exemplary embodiment of the present disclosure, an airfoil for a gas turbine engine is provided. The airfoil includes opposite pressure and suction sides extending radially along a span; the pressure and suction sides define an outer surface of the airfoil. The airfoil also includes opposite leading and trailing edges extending radially along the span. The pressure and suction sides extend axially between the leading and trailing edges. The leading edge defines a forward end of the airfoil, and the trailing edge defining an aft end of the airfoil. Moreover, the airfoil includes a trailing edge portion defined adjacent the trailing edge at the aft end of the airfoil. A plurality of ceramic matrix composite airfoil plies define the pressure and suction sides of the airfoil, and a plurality of ceramic matrix composite plenum plies defining a plenum forward of the trailing edge portion. Further, a filler pack is positioned between the airfoil plies and the plenum plies within the trailing edge portion of the airfoil, and a cooling passage is defined within the filler pack for directing a cooling fluid from the plenum to the outer surface of the airfoil. The cooling passage is defined proximate the suction side.

In a further exemplary embodiment of the present disclosure, a method for forming an airfoil for a gas turbine engine is provided. The method includes laying up a ceramic matrix composite material to form an airfoil preform assembly. The airfoil preform assembly includes opposite pressure and suction sides extending radially along a span, opposite leading and trailing edges extending radially along the span, and a plenum defined within the airfoil preform assembly. The pressure and suction sides extend axially between the leading and trailing edges. The method also includes processing the airfoil preform assembly to produce the airfoil, and a cooling passage is defined within the airfoil. The cooling passage is defined from the plenum to the trailing edge of the airfoil and is defined proximate the suction side of the airfoil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-sectional view of an exemplary gas turbine engine according to various embodiments of the present subject matter.

FIG. 2 provides a side perspective view of a turbine rotor blade according to an exemplary embodiment of the present subject matter.

FIG. 3 provides a perspective view of a turbine nozzle segment according to an exemplary embodiment of the present subject matter.

FIG. 4 provides a cross-section view of a portion of an airfoil of the turbine nozzle segment, taken along the line 4-4 of FIG. 3, according to an exemplary embodiment of the present subject matter.

FIG. 5 provides a cross-section view of a portion of the airfoil of the turbine nozzle segment, taken along the line 5-5 of FIG. 4, according to an exemplary embodiment of the present subject matter.

FIG. 6 provides the cross-section view of the portion of the airfoil of the turbine nozzle segment of FIG. 5 according to another exemplary embodiment of the present subject matter.

FIG. 7 provides the cross-section view of the portion of the airfoil of the turbine nozzle segment of FIG. 3 according to another exemplary embodiment of the present subject matter.

FIG. 8 provides a chart illustrating a method for forming an airfoil of a gas turbine engine according to an exemplary embodiment of the present subject matter.

FIG. 9 provides a chart illustrating a portion of the method of FIG. 8 according to an exemplary embodiment of the present subject matter.

FIG. 10 provides a cross-section view of an airfoil preform assembly according to an exemplary embodiment of the present subject matter.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms “first,” “second,” and “third” may be used interchangeably to distinguish one component from another and are not intended to signify location or importance of the individual components. The terms “upstream” and “downstream” refer to the relative direction with respect to fluid flow in a fluid pathway. For example, “upstream” refers to the direction from which the fluid flows and “downstream” refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as “turbofan engine 10.” As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a variable pitch fan 38 having a plurality of fan blades 40 coupled to a disk 42 in a spaced apart manner. As depicted, fan blades 40 extend outward from disk 42 generally along the radial direction R. Each fan blade 40 is rotatable relative to disk 42 about a pitch axis P by virtue of the fan blades 40 being operatively coupled to a suitable actuation member 44 configured to vary the pitch of the fan blades 40. Fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP)

compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of turbofan engine 10, particularly components within hot gas path 78, may comprise a ceramic matrix composite (CMC) material, which is a non-metallic material having high temperature capability. Exemplary CMC materials utilized for such components may include silicon carbide, silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). As further examples, the CMC materials may also include silicon carbide (SiC) or carbon fiber cloth.

CMC materials may be used for various components of the engine, for example, airfoils in the turbine, compressor, and/or fan regions. The compressor and turbine generally include rows of airfoils that are stacked axially in stages. Each stage includes a row of circumferentially spaced stator vanes and a rotor assembly that rotates about centerline 12 of engine 10. Turbine nozzles, comprising stator vanes extending between inner and outer bands, direct the hot combustion gas in a manner to maximize extraction at the adjacent downstream turbine blades. In various embodiments of engine 10, the nozzles and/or turbine blades, including their associated airfoils, may be CMC components. Of course, other components of turbine engine 10 also may be formed from CMC materials.

Referring now to FIG. 2, a side, perspective view of a turbine rotor blade 74, a portion of a turbine rotor assembly, is provided according to an exemplary embodiment of the present subject matter. As previously described, LP turbine 30 includes sequential stages of turbine stator vanes 72 coupled to outer casing 18 and turbine rotor blades 74 coupled to shaft or spool 36. Each blade 74 includes an airfoil 80 having a concave pressure side 82 opposite a convex suction side 84. Opposite pressure and suction sides 82, 84 of each airfoil 80 extend radially along a blade span S from a root 86 to a tip 87 and define an outer surface 85 of airfoil 80. As depicted, root 86 is the radially innermost portion of airfoil 80 and tip 87 is the radially outermost portion of airfoil 80. Moreover, as further shown in FIG. 2, pressure and suction sides 82, 84 of airfoil 80 extend axially between a leading edge 88 and an opposite trailing edge 90. Leading and trailing edges 88, 90 extend radially from root 86 to tip 87. Further, leading edge 88 defines a forward end of airfoil 80 (labeled Fwd in the Figures), and trailing edge 90 defines an aft end of airfoil 80 (labeled Aft in the Figures). Moreover, airfoil 80 defines a chord C extending axially between opposite leading and trailing edges 88, 90. Moreover, airfoil 80 defines a width W between pressure side 82 and suction side 84. The width W of airfoil 80 may vary along the span S.

Each blade 74 is coupled to shaft or spool 36 via root 86. More particularly, root 86 is coupled to a turbine rotor disk (not shown), which in turn is coupled to shaft or spool 36 (FIG. 1). It will be readily understood that, as is depicted in FIG. 2 and is generally well-known in the art, root 86 may define a projection 89 having a dovetail or other shape for receipt in a complementarily shaped slot in the turbine rotor disk to couple blade 74 to the disk. Of course, each blade 74 may be coupled to the turbine rotor disk and/or shaft or spool 36 in other ways as well. In any event, blades 74 are coupled to the turbine rotor disks such that a row of circumferentially adjacent blades 74 extends radially outward from the perimeter of each disk, i.e., adjacent blades 74 within a blade row are spaced apart from one another along a circumferential direction M and each blade 74 extends from the disk along the radial direction R. As such, the turbine rotor disk and outer casing 18 form an inner end wall and an outer end wall, respectively, of hot gas path 78 through the turbine assembly.

Referring now to FIG. 3, a perspective view is provided of a turbine nozzle segment. A turbine stator is formed by a plurality of turbine nozzle segments that are abutted at circumferential ends to form a complete ring about centerline 12. Each nozzle segment may comprise one or more vanes, such as vanes 68 of HP turbine 28 or vanes 72 of LP turbine 30, that extend between an outer band and an inner band as previously described. FIG. 3 depicts an exemplary turbine nozzle segment 67 of HP turbine 28. Nozzle segment 67 includes outer band 67_a_ and inner band 67_b_, between which extends stator vanes 68. Each stator vane 68 includes an airfoil 80, which has the same features as airfoil 80 described above with respect to blade 74. For example, airfoil 80 of vane 68 has a pressure side 82 opposite a suction side 84. Opposite pressure and suction sides 82, 84 of each airfoil 80 extend radially along a span from a vane root at inner band 67_b_ to a vane tip at outer band 67_a_. Moreover, pressure and suction sides 82, 84 of airfoil 80 extend axially between a leading edge 88 and an opposite trailing edge 90. Airfoil 80 further defines a chord extending axially between opposite leading and trailing edges 88, 90. Moreover, airfoil 80 defines a width between pressure side 82 and suction side 84, which may vary along the span.

It will be appreciated that, although airfoil 80 of vane 68 may have the same features as airfoil 80 of blade 74, airfoil 80 of vane 68 may have a different configuration than airfoil 80 of blade 74. As an example, the span of airfoil 80 of vane 68 may be larger or smaller than the span of airfoil 80 of blade 74. As another example, the width and/or chord of airfoil 80 of vane 68 may differ from the width and/or chord of airfoil 80 of blade 74. Additionally or alternatively, airfoils 80 of LP stator vanes 72 and/or airfoils 80 of HP turbine rotor blades 70 may differ in size, shape, and/or configuration from airfoils 80 of HP stator vanes 68 and LP turbine rotor blades 74. However, it also should be understood that, while airfoils 80 may differ in size, shape, and/or configuration, the subject matter described herein may be applied to any airfoil within engine 10, as well as other suitable components of engine 10.

FIG. 4 provides a cross-sectional view of a portion of airfoil 80 of stator vane 68, taken along the line 4-4 of FIG. 3. FIG. 5 provides a cross-sectional view of the portion of airfoil 80, taken along the line 5-5 of FIG. 4. As illustrated, airfoil 80 is a CMC component of engine 10. In the depicted embodiment, pressure and suction sides 82, 84 of airfoil 80 are defined by a first plurality of plies 92. Airfoil 80 further comprises a second plurality of plies 96 defining a plenum 98 within airfoil 80. Plenum 98 receives a flow of cooling fluid F, e.g., a flow of pressurized air diverted from HP compressor 24. Further, it will be appreciated that the first plurality of plies 92 also may be referred to as airfoil plies 92, and the second plurality of plies 96 also may be referred to as plenum plies 96.

Continuing with FIG. 4, each of the plurality of airfoil plies 92 extends from pressure side 82 to suction side 84 of airfoil 80. In the embodiment illustrated in FIGS. 3 and 4, each ply 92 wraps from pressure side 82 to suction side 84 around leading edge 88, or from suction side 84 to pressure side 82 around leading edge 88, and thereby define leading and trailing edges 88, 90 of airfoil 80. Plenum plies 96 define plenum 98 between pressure and suction sides 82, 84, i.e., within airfoil 80. One or more filler packs 94 are positioned between airfoil plies 92 and plenum plies 96 within a trailing edge portion 91 of airfoil 80 as shown in FIG. 4. Trailing edge portion 91 is defined adjacent trailing edge 90 at the aft end of airfoil 80; plenum 98 is defined within airfoil 80 forward of trailing edge portion 91, i.e., closer to the forward end of airfoil 80 than the aft end. It will be appreciated that filler pack 94 also may be positioned between airfoil and plenum plies 92, 96 within other portions of airfoil 80, or multiple filler packs 94 may be used as needed between plies 92, 96. In other embodiments, filler pack or packs 94 may be omitted.

Preferably, airfoil and plenum plies 92, 96 contain continuous CMC fibers along their lengths. Continuous fiber CMC plies can help avoid relying on the interlaminar capability of the airfoil material to resist stresses on the airfoil. The continuous fibers may be maintained, e.g., by wrapping each airfoil ply 92 from one of pressure and suction sides 82, 84 to the other of pressure and suction sides 82, 84 around one or both of leading and trailing edges 88, 90. Plenum plies 96 may be wrapped around a mandrel or other appropriate support to help maintain continuous fibers in plies 96 as airfoil 80 is formed.

It should be appreciated that, in general, filler packs 94 may be formed from any suitable material and/or by using any suitable process. For example, in several embodiments, each filler pack 94 may be formed from a suitable fiber-reinforced composite material, such as a carbon or glass fiber-reinforced composite material. For instance, one or more fabric plies may be wrapped in a suitable manner to form one or more filler packs 94 defining the desired shape of an interior of airfoil 80, such as by shaping suitable ply packs to form each filler pack 94. In another embodiment, discontinuous materials, such as short or chopped fibers, particulates, platelets, whiskers, etc., may be dispersed throughout a suitable matrix material and used to form each filler pack 94.

Additionally, it should be appreciated that, in several embodiments, each filler pack 94 may correspond to a pre-fabricated component. In such embodiments, the filler pack(s) may be installed within the interior of airfoil 80 during or following manufacturing of the nozzle segment 67 or rotor blade 74. Alternatively, each filler pack 94 may be assembled or otherwise formed within airfoil 80. For instance, when filler pack 94 is formed from one or more fabric plies, the plies may be laid up within airfoil 80 together with the plies being used to create the airfoil structure.

As shown in FIGS. 3 and 4, airfoil 80 defines cooling passages 100 within trailing edge portion 91 for providing a flow of cooling fluid at trailing edge 90 of airfoil 80. In the depicted embodiments, cooling channels 100 are defined proximate suction side 84 of airfoil 80 to cool suction side 84. Further, in the depicted embodiments, trailing edge portion 91 is essentially solid except for cooling passages 100 defined therein.

More particularly, in the embodiment depicted in FIG. 5, cooling passages 100 comprise crossover apertures 102, a first cavity 104, channels 106, a second cavity 108, and ejection apertures 110. First cavity 104 is a radially extending cavity defined in filler pack 94. Referring particularly to FIG. 4, first cavity 104 may be defined within filler pack 94 at a generally location closer to suction side 84 than pressure side 82 of airfoil 80. Further, at least one crossover aperture 102 is defined in plenum plies 96 such that crossover aperture 102 extends from plenum 98 to first cavity 104 and thereby facilitates a flow of cooling fluid from plenum 98 to first cavity 104, i.e., crossover aperture 102 fluidly connects plenum 98 and first cavity 104. In some embodiments, first cavity 104 may not be defined immediately adjacent plenum plies 96, and in such embodiments, crossover aperture 102 may extend through plenum plies 96 and filler pack 104 to fluidly connect plenum 98 and first cavity 104. Airfoil 80 may include a plurality of crossover apertures 102, as shown in FIG. 5.

Like first cavity 104, second cavity 108 is a radially extending cavity defined in filler pack 94, and second cavity 108 is defined aft of first cavity 104. At least one channel 106 is defined from first cavity 104 to second cavity 108 to facilitate the flow of cooling fluid from first cavity 104 to second cavity 108, i.e., channel 106 extends axially between cavities 104, 108 such that the cavities fluidly connect the plurality of channels 106. Preferably, a plurality of channels 106 are defined from first cavity 104 to second cavity 108, each channel 106 extending axially between the cavities. Further, as shown most clearly in FIG. 4, channels 106 may be defined in filler pack 94 adjacent suction side 84 of airfoil 80 to provide cooling to suction side 84. By providing suction side cooling using a flow of cooling fluid through channels 106, film cooling on suction side 84 may be reduced or eliminated, which may improve the performance of engine 10 by reducing an loss penalty that is incurred through the use of film cooling.

Moreover, at least one ejection aperture 110 is defined in airfoil plies 92 such that ejection aperture 110 extends from outer surface 85 of airfoil 80 to second cavity 108 and thereby facilitates a flow of cooling fluid from second cavity 108 to outer surface 85, i.e., ejection aperture 110 fluidly connects second cavity 108 and outer surface 85. In some embodiments, second cavity 108 may not be defined immediately adjacent airfoil plies 92 as shown in FIG. 4, and in such embodiments, ejection aperture 110 may extend through airfoil plies and filler pack 104 to fluidly connect second cavity 108 and outer surface 85. Further, airfoil 80 may include a plurality of ejection apertures 110, as shown in FIG. 5.

Accordingly, as illustrated in FIGS. 4 and 5, cooling passages 100, comprising crossover apertures 102, first cavity 104, channels 106, second cavity 108, and ejection apertures 110, are in fluid communication with plenum 98 to direct the flow of cooling fluid from plenum 98 to outer surface 85 and particularly toward trailing edge 90 of airfoil 80. The fluid flow F received within plenum 98 generally is cooler than the combustion gases flowing against or over outer surface 85 of airfoil 80. Each cooling passage 100, extending from plenum 98 to outer surface 85 via crossover apertures 102, first cavity 104, channels 106, second cavity 108, and ejection apertures 110, forms a continuous pathway in fluid communication with plenum 98 to facilitate flowing cooling fluid F from plenum 98 to outer surface 85. As such, the flow of cooing fluid F over outer surface 85 and trailing edge 90 may help reduce the temperatures to which outer surface 85 and trailing edge 90 are exposed.

As illustrated in FIG. 5, a plurality of cooling passages 100 may be used throughout the trailing edge portion 91 of airfoil 80. As discussed, first and second cavities 104, 108 may extend radially through filler pack 94, and a plurality of ejection apertures 110 may be defined from outer surface 85, e.g., at or adjacent trailing edge 90, to second cavity 108; a plurality of channels 106 may be defined from first cavity 104 to second cavity 108; and a plurality of crossover apertures 102 may be defined from plenum 98 to first cavity 104. Thus, crossover apertures 102 provide a flow of cooling fluid from plenum 98 to first cavity 104, and the cooling fluid may then be ejected to outer surface 85 of airfoil 80 via channels 106, second cavity 108, and ejection apertures 110. An identical number of crossover apertures 102, channels 106, and ejection apertures 110 need not be provided, as shown in FIG. 5. Rather, the number of crossover apertures 102 provided in airfoil 80 may be fewer or greater than the number of channels 106 and/or ejection apertures 110.

FIG. 6 provides an alternative embodiment of the trailing edge portion 91 of airfoil 80 illustrated in FIG. 5. As shown in FIG. 6, rather than first and second cavities 104, 108 extending radially through filler pack 94 and fluidly connecting a plurality of crossover apertures 102, channels 106, and ejection apertures 110, a plurality of first chambers 112 and a plurality of second chambers 114 may be provided such that crossover apertures 102, channels 106, and ejection apertures 110 are not fluidly connected with one another within filler pack 94. Instead, each ejection aperture 110 is in fluid communication with a second chamber 114, which in turn is in fluid communication with a channel 106, which is in fluid communication with a first chamber 112, which is in fluid communication with a crossover aperture 102 to receive a flow F of cooling fluid from plenum 98. That is, second chamber 114 is defined within filler pack 94 aft of first chamber 112 defined within filler pack 94, and the chambers are fluidly connected by channel 106. Together, each crossover aperture 102, first chamber 112, channel 106, second chamber 114, and ejection aperture 110 defines a cooling passage 100. Thus, in embodiments such as illustrated in FIG. 6, each cooling passage 100 defined in airfoil 80 includes a crossover aperture 102, a first chamber 112, a channel 106, a second chamber 114, and an ejection aperture 110, and airfoil 80 comprises a plurality of cooling passages 100.

Crossover apertures 102, channels 106, and ejection apertures 110 may range from about 10 to about 30 mils in diameter. For example, in one embodiment, each crossover aperture 102 may be about 20 mils in diameter, each channel 106 may be about 10 mils in diameter, and each ejection aperture 110 may be about 15 mils in diameter. In other embodiments, one crossover aperture 102 may have a different diameter than another crossover aperture 102. Alternatively or additionally, one channel 106 may have a different diameter than another channel 106, and one ejection aperture 110 may have a different diameter than another ejection aperture 110. Further, although generally described as being substantially cylindrical in shape or generally circular in cross-sectional shape, crossover apertures 102, channels 106, and ejection apertures 110, as well as cavities 104, 108 and chambers 112, 114, may have any appropriate shape and/or cross-section. For example, as shown in FIG. 4, first cavity 104 and second cavity 108 may have generally triangular cross-sectional shapes. Described differently, first cavity 104 may have a cross-sectional shape that is generally tapered from plenum plies 96 to channel 106, and second cavity 108 may have a cross-sectional shape that is generally tapered from airfoil plies 92 to channel 106. Moreover, the number of each void, e.g., crossover aperture 102, channel 106, ejection aperture 110, cavities 104, 108, and/or chambers 112, 114, may vary from one airfoil to another. As an example, airfoil 80 of turbine blade 74 may have one number of channels 106, and the airfoil of a stator vane 68 may have a different number of channels 106. In one example embodiment, an engine 10 may comprise airfoils having channels 106, where channels 106 of each airfoil range in number from about 10 to 40 channels, generally with larger airfoils (e.g., larger in the radial direction R, axial direction A, circumferential direction M, or all three directions R, A, and M) having a greater number of channels 106.

The shape, size, and number of each void, e.g., cavities 104, 108 and/or chambers 112, 114, crossover aperture 102, channel 106, and ejection aperture 110, may be optimized for each airfoil. As described above, the number of channels 106 may depend on the relative size of the airfoil. Further, the size, shape, and/or number of voids 102, 104, 106, 108, 110, 112, 114 may depend on the desired cooling effects achieved by flowing cooling fluid from plenum 98 through voids 102, 104, 106, 108, 110, 112, 114. For example, achieving high velocity cooling fluid flow through channels 106 may increase the heat transfer coefficient and thereby increase the rate of cooling provided by cooling passages 100. As a result, having a larger number of holes or voids with smaller cross-sectional areas may be beneficial. However, too many voids within the airfoil can be detrimental to the strength of the material forming the airfoil and having too many rows of cooling passages over airfoil 80 can increase cooling flow to an extent that negatively impacts the performance of engine 10. Therefore, an optimal number, shape, and size of voids 102, 104, 106, 108, 110, 112, 114 provides beneficial cooling without overly weakening the airfoil material or negatively impacting engine performance, e.g., an optimal configuration of cooling passages 100 may decrease specific fuel consumption.

The size and/or shape of the voids forming cooling passages 100 may be defined by various parameters of each void. For example, as shown in FIGS. 3, 4, and 5, channel 106 has a length $L_1$, which extends generally along the axial direction A. Also, crossover aperture 102 has a width $W_{cr}$.

First cavity 104 (or first chamber 112 in embodiments having first chamber 112 rather than first cavity 104) has a width $W_1$ adjacent crossover aperture 102, and channel 106 has a width $W_{ch}$. In the depicted embodiment, width $W_1$ tapers to channel width $W_{ch}$, i.e., width $W_{ch}$ is smaller or less than width $W_1$. Further, second cavity 108 (or second chamber 114 in embodiments having second chamber 114 rather than second cavity 108) has a width $W_2$ adjacent ejection aperture 110, which tapers to channel width $W_{ch}$ in the embodiment of FIG. 4. Ejection aperture 110 has a width $W_{e1}$ adjacent second cavity 108 (or second chamber 114) that is smaller than a width $W_{e2}$ of ejection aperture 110 at outer surface 85, i.e., ejection aperture 110 may have a greater width at outer surface 85 that tapers to a smaller width at or near cavity 108 or chamber 112. Moreover, it will be understood that, although described as widths, the foregoing dimensions may be diameters in embodiments in which the voids are rounded or generally circular in cross-sectional shape.

In addition, the size and/or shape of cavities 104, 108 and chambers 112, 114 may be selected to help in fabricating airfoil 80. More particularly, a larger cross-sectional area of first cavity 104 or first chamber 112 may help in forming crossover apertures 102 to fluidly connect plenum 98 and first cavity 104 or first chamber 112. For example, a first cavity 104 having a larger cross-sectional area oriented toward a location where crossover apertures 102 will be machined through plenum plies 96 (or plies 96 and filler pack 94) will provide a larger target area for machining apertures 102. As shown in FIG. 4 and as previously described, first cavity 104 may have a generally triangular or tapered cross-sectional shape, with a longer side oriented toward plenum 98. As such, crossover apertures 102 may be formed from plenum 98 to first cavity 104 even if crossover apertures 102 are not formed at the exact intended location, i.e., crossover apertures 102 do not have to be held to as tight of a tolerance if first cavity 104 provides a larger area in which crossover aperture 102 can join first cavity 104. Likewise, in some embodiments, second cavity 108 may be formed, shaped, and/or oriented to provide a sufficient target for forming ejection apertures 110 from outer surface 85 to second cavity 108. In still other embodiments, chambers 112, 114 may be similarly formed, shaped, and/or oriented to provide a large target for forming crossover apertures 102 to connect first chamber 112 and plenum 98 and for forming ejection apertures 110 to provide a passage from second chamber 114 to outer surface 85 of airfoil 80. By positioning, sizing, and shaping cavities 104, 108 and/or chambers 112, 114 as described, any tolerances required for drilling, machining, or otherwise forming crossover apertures 102 and ejection apertures 110 may be accommodated without increasing the thickness of trailing edge portion 91. Accordingly, the weight of airfoil 80 and the material required to produce airfoil 80 do not have to be increased to accommodate tolerances in forming cooling passages 100 in trailing edge portion 91 of airfoil 80. Moreover, optimal cooling passage size, shape, and/or position may decrease a time required to manufacture airfoil 80, e.g., by reducing the time required to drill, machine, or otherwise form crossover apertures 102 and ejection apertures 110. Reducing the complexity and length of the manufacturing process also may decrease manufacturing costs.

Although cooling passages 100 may be particularly beneficial along or adjacent trailing edge 90 of airfoil 80, cooling passages 100 may be suitable for any location on airfoil 80 and, for example, may be defined over pressure and suction sides 82, 84 of airfoil 80. Further, referring to FIG. 7, the portions of cooling passage 100 may be defined at various locations throughout airfoil 80. For example, as depicted in FIG. 7, crossover aperture 102 and first cavity 104 are defined closer to leading edge 88 of airfoil 80 than in the embodiment depicted in FIG. 4. As such, for airfoils 80 having identical dimensions apart from cooling passages 100, channel 106 of the embodiment shown in FIG. 7 has a length $L_2$ that is greater or longer than length $L_1$ of channel 106 of the embodiment shown in FIG. 4. By utilizing a longer channel 106, cooling passages 100 of embodiments such as illustrated in FIG. 7 may provide cooling to a greater portion of suction side 84 of airfoil 80.

Additionally or alternatively, ejection aperture 110 may be biased to one or the other of pressure side 82 and suction side 84 rather than being defined exactly at trailing edge 90. For example, as shown in FIG. 4, ejection aperture 110 exits at outer surface 85 on pressure side 82 of airfoil 80, i.e., ejection aperture 110 defines an outlet 116 at pressure side 82. In other embodiments, ejection aperture 110 may be biased to exit at outer surface 85 on suction side 84 of airfoil 80, i.e., ejection aperture 110 may define an outlet 116 at suction side 84. Moreover, for airfoils 80 comprising a plurality of cooling passages 100, outlets 116 may be defined at various axial locations along pressure side 82 or suction side 84, i.e., outlets 116 may not be radially aligned. As such, outlets 110 of cooling passages 100 may be spaced apart generally along the axial direction A as well as the radial direction R. Further, the use of multiple cooling passages 100 at multiple locations of airfoil 80 may help enhance the surface cooling provided by the cooling fluid flowing from each passage 100.

Various methods, techniques, and/or processes may be used to form crossover apertures 102, first cavity 104, channels 106, second cavity 108, ejection apertures 110, and first and second chambers 112, 114 in airfoil 80. For example, in some embodiments, the portion of crossover aperture 102 defined through plenum plies 96 may be defined by cutting each individual plenum ply 96 before plenum plies 96 are laid up to form airfoil 80. Similarly, the portion of ejection aperture 110 defined through airfoil plies 92 may be defined by cutting each individual airfoil ply 92 before airfoil plies 92 are laid up to form airfoil 80. In one embodiment, plies 92, 96 are cut using a precision Gerber cutter by Gerber Technology of Tolland, Conn. In other embodiments, another type of cutter or other means for defining cut-outs in plies 92, 96 may be used. As another example of forming voids in airfoil 80, crossover apertures 102 and ejection apertures 110 may be defined in plenum plies 96 and airfoil plies 92, respectively (as well as in filler pack 94 in some embodiments), using electrical discharge machining (EDM), i.e., EDM drilling.

Ina further example, voids 102, 104, 106, 108, 110, 112, 114 may be formed using one or more fugitive material inserts. That is, an insert made from a fugitive material may be in a desired form (e.g., shape, size, etc.) to define the corresponding void, e.g., crossover apertures 102, first cavity 104, channels 106, second cavity 108, ejection apertures 110, and/or chambers 112, 114. The fugitive material insert is positioned within the lay-up as plenum plies 96, filler pack 94, and airfoil plies 92 are laid up to form airfoil 80. In some embodiments, the insert may be formed of SiC fibers in a silica carbide matrix. The insert may be one of various forms, such as a tape cast, a preformed silicon dioxide tube, or a rapid prototype polymer coating with boron nitride, and the insert may be formed in various manners, e.g., sprayed, screen printed, or injection molded. For example, the fugitive material insert may be a fugitive material particulate bound by polymer in a flexible tape. It may be desirable that the fugitive material insert be a low melting metal or alloy that may melt during a burnout pyrolysis operation or melt infiltration of a CMC layup preform, to thereby leave a void in the preform. In alternative embodiments, the fugitive material insert may be formed of a high temperature material that will not melt during the burnout pyrolysis operation. For example, such fugitive materials include, but are not limited to, boron nitride (BN), silicon oxide, silicon oxide coated with boron nitride, rare earth elements, rare earth elements coated with boron nitride, rare earth oxides, rare earth oxides coated with boron nitride, rare earth silicate, rare earth silicate coated with boron nitride, elemental molybdenum, elemental molybdenum coated with boron nitride, molybdenum silicides, molybdenum silicides coated with boron nitride, gallium oxide, gallium nitride, indium oxide, indium nitride, tin oxide, tin nitride, indium tin oxide (ITO), alkaline earth silicates where the alkaline earth is magnesium, calcium, strontium, barium, and combinations thereof, alkaline earth aluminates, diamond powder, diamond powder coated with boron nitride, or boron nitride coated with carbon and mixtures and combinations thereof. All of these high temperature materials may be placed into the CMC during layup as a flexible tape filled with powders of the high temperature materials. Alternately, all of these high temperature materials may also be placed into the CMC during layup as a dense, flexible wire or an inflexible rod or tube. Such high temperature materials, after the CMC component is melt infiltrated, may require a subsequent air heat treatment to oxidize the high temperature material, a vacuum heat treatment, an inert gas heat treatment, an acid treatment, a base treatment, combinations thereof, or alternating combinations thereof, to remove the fugitive material. Thus, the fugitive material may be removed by melting, dissolution, sublimation, evaporation, or the like.

Accordingly, various materials are suitable for use as the insert, such as materials that exhibit non-wetting of the CMC preform, low or no reactivity with the constituents of the CMC preform, and/or are completely fusible and drainable at a temperature of a thermal treatment performed on the CMC preform. In one example embodiment, fugitive material inserts for defining channels 106 are formed of fused silicon dioxide ($SiO_2$) in a tubular shape, i.e., as quartz tubes or rods. The tubes have, as a non-limiting example, an inner diameter of 10 mils and an outer diameter of 30 mils. The tubes may be positioned in an array within trailing edge portion 91 of a layup of plies 92, 96 and filler pack(s) 94 for forming airfoil 80. Following a melt infiltration process, the fused silicon dioxide is reduced to SiO. Such an insert will not wet or react with the constituents of the preform. Additionally, the insert may melt and be allowed to drain from the preform during burnout, leaving the CMC preform with voids forming channels 106.

FIG. 8 provides a chart illustrating an exemplary method 800 for fabricating airfoil 80. As represented at 802 in FIG. 8, plies 92, 96 and filler pack(s) 94 are laid up in the form of airfoil 80, i.e., laid up in a desired shape to produce an airfoil preform assembly. The layup step or portion of the process thus may be referred to as the layup preforming step. The layup preforming step may comprise layering multiple plies or structures, such as plies pre-impregnated (pre-preg) with matrix material, pre-preg tapes, or the like, to form a desired shape of the resultant CMC component, e.g., airfoil 80. The layers are stacked to form a layup or preform, which is a precursor to the CMC component.

In some embodiments, multiple layups or preforms may be laid up together to form a preform assembly. More particularly, the layup portion of method 800 depicted at 802 may include laying up multiple preforms and/or plies in an airfoil preform assembly 80P. Referring to FIG. 9, in an exemplary embodiment, the layup preforming step 802 may include forming a plenum preform 96P and a filler pack preform 94P, which are laid up with airfoil plies 92 and a second filler pack portion 94*b* to produce airfoil preform assembly 80P. More specifically, as shown at 902 in FIG. 9, plenum plies 96 are laid up, e.g., in or on a layup tool, mandrel, or mold, to define a plenum preform 96P, illustrated in FIG. 10. As shown in FIG. 10, plenum preform 96P generally defines the shape of plenum 98 of airfoil 80. The plenum preform 96P may be compacted as illustrated at 904, and then processed in an autoclave as shown at 906. The compaction may be performed at atmosphere, i.e., at room temperature. The autoclave processing may be performed at reduced temperature compared to a standard autoclave cycle such that plenum preform 96P retains some flexibility and malleability after autoclaving. Such flexibility and malleability may help in laying up plenum preform 96P with other preforms and plies to produce preform assembly 80P. In some embodiments, the compaction and/or autoclaving steps 904, 906 may be omitted, i.e., the compaction and autoclaving indicated at 904 and 906 are optional, such that defining the plenum preform 96P comprises laying up plenum plies 96 without additional processing. Further, in other embodiments, prior to, or as part of, laying up plenum plies 96 at 902, plenum plies 96 may be cut to define at least a portion of crossover aperture(s) 102.

The layup preforming shown at 802 in FIG. 8 further may include forming a filler pack preform 94P, as shown in FIG. 9. As indicated at 908, filler pack material 94 is laid up, e.g., in or on a layup tool, mandrel, or mold, to define the filler pack preform 94P. Next, at 910, filler pack preform 94P is compacted, e.g., at atmosphere as described above with respect to the plenum preform. Then, as shown at 912, the filler pack preform 94P is processed in an autoclave, e.g., at a reduced temperature relative to a standard autoclave cycle such that filler pack preform 94P retains some flexibility and malleability after autoclaving. The flexibility and malleability may help in defining voids in the filler pack preform as illustrated at 914 in FIG. 9. More particularly, after autoclaving, filler pack preform 94P is in a green state, and after autoclaving at a reduced temperature, the green state filler pack preform 94P retains some flexibility and malleability that can assist in further manipulation of the preform. For example, the voids forming first cavity 104, channel(s) 106, and second cavity 108 may be machined in the green state filler pack preform 94P; in other embodiments, the voids forming first chamber(s) 112, channel(s) 106, and second chamber(s) 114 may be machined in the green state filler pack preform 94P. The malleability of green state preform 94P may help in forming voids 104, 106, 108 or 112, 106, 114. In various embodiments, the voids may be formed using one or more of laser drilling, EDM, cutting, or other machining methods. In other embodiments, one or more of voids 104, 106, 108, or voids 112, 106, 114, may be formed using fugitive material inserts and one or more of the processes or steps previously described.

Referring still to FIG. 9, as shown at 916, laying up the CMC material to produce airfoil preform assembly 80P also may include preparing airfoil plies 92 for laying up with plenum preform 96P and filler pack preform 94P. In some embodiments, preparing the airfoil plies 92 may include cutting plies 92 to define at least a portion of ejection aperture(s) 110. In other embodiments, ejection aperture(s) 110 may be defined in the airfoil preform assembly 80P after the various portions are laid up as shown at 802 in FIG. 8 or after processing the airfoil preform assembly as further described below, e.g., ejection apertures 110 may be machined after an environmental barrier coating is applied to airfoil 80. It will be appreciated that, when laid up with filler pack preform 94P and plenum preform 96P, airfoil plies 92 generally define the shape of pressure and suction sides 82, 84 of the resultant airfoil 80.

Further, as shown at 918 in FIG. 9, laying up the CMC material to form airfoil preform assembly 80P may include laying up one or more additional filler pack(s). For example, referring to FIG. 10, a second filler pack portion 94*b* and additional filler pack material 94 may be laid up with filler pack preform 94P and plenum preform 96P to further define voids 104, 106, 108 (or voids 112, 106, 114 in embodiments utilizing first and second chambers 112, 114 rather than first and second cavities 104, 108) within airfoil 80 and to fill in any gaps between plenum preform 96P and airfoil plies 92. In particular embodiments, second filler pack portion 94*b* may be configured to fully define the shape of voids 104, 106, 108 (or voids 112, 106, 114), i.e., the voids may be partially defined by filler pack preform 94P and partially defined by second filler pack portion 94*b*. In some embodiments, second filler pack portion 94*b* may be formed as a filler pack 94 or may be formed from a stack of CMC tapes or the like. As and if needed, additional filler pack(s) 94 may be positioned between airfoil plies 92 and plenum preform 96P as shown in FIG. 10.

Accordingly, at layup preforming step 802 of method 800, the plenum preform 96P, filler pack preform 94P, airfoil plies 92, and additional filler pack portions 94, 94*b* may be laid up together to form airfoil preform assembly 80P. In some embodiments, the layup preforming step 802 also may comprise positioning one or more fugitive material inserts within the layers to form one or more of voids 102, 104, 106, 108, 110, 112, 114 within airfoil 80 as described above.

Next, airfoil preform assembly 80P is processed as shown at 804 in FIG. 8. For example, airfoil preform assembly 80P may be processed in an autoclave using a standard autoclave process. As such, airfoil preform assembly 80P may be autoclaved at a higher temperature than filler pack preform 94P and plenum preform 96P as described above. After processing, if crossover aperture(s) 102 and ejection aperture(s) 110 are not formed by cutouts in plenum plies 96 and airfoil plies 92, these apertures may be defined in the green state airfoil preform assembly. For example, crossover aperture(s) 102 may be EDM drilled from plenum 98 into the airfoil preform assembly, e.g., through plenum preform 96P and filler pack preform 94P, to the extent crossover aperture(s) 102 extend through filler pack 94. In various embodiments, the voids may be formed using one or more of laser drilling, EDM, cutting, or other machining methods or using fugitive material inserts as previously described.

Next, as shown at 806 in FIG. 8, the airfoil preform assembly may undergo a burn-out cycle, i.e., a burn-out cycle may be performed. In an example burn-out cycle, any mandrel-forming materials, as well as certain fugitive materials or other meltable materials such as additional binders, are melted to remove such materials. During burn-out, the CMC airfoil preform assembly may be positioned to allow the melted materials to run out of the preform and thus remove the materials from the preform.

Then, as illustrated at 808, the CMC airfoil preform assembly may be subjected to one or more post-processing cycles for densification of the preform assembly. Densification may be performed using any known densification technique including, but not limited to, Silcomp, melt infiltration (MI), chemical vapor infiltration (CVI), polymer infiltration and pyrolysis (PIP), and oxide/oxide processes. Densification can be conducted in a vacuum furnace having an established atmosphere at temperatures above 1200° C. to allow silicon or other materials to melt-infiltrate into the preform component.

Additionally or alternatively, after burn-out and post-processing steps 806, 808, airfoil 80 may be manipulated mechanically or chemically as shown at 810 in FIG. 8 to remove any remaining fugitive material inserted into the preformed shape during layup preforming step 802. In some cases, the heat treatment may be used to oxidize the insert to an oxide that may be melted or dissolved in an acid or base. In other embodiments, the insert may be directly dissolved in acid or base, or otherwise chemically dissolved. In further embodiments, the insert may be sublimed or evaporated in a vacuum heat treatment. In still other embodiments, the insert may be oxidized and subsequently sublimed or evaporated in a vacuum heat treatment. Mechanical methods may be used to mechanically remove the insert, and such mechanical methods may or may not be used with any of the previously described methods. Various chemical methods may be utilized as well.

After any remaining fugitive material is removed at step 810, airfoil 80 may be finish machined as shown at 812. Finish machining may include clearing the formed features, such as crossover apertures 102 and ejection apertures 110, with wire to, e.g., ensure proper flow through the voids. Subsequently, an environmental barrier coating (EBC) may be applied to the airfoil 80, as shown at step 814. In embodiments where ejection apertures 110 are formed prior to coating airfoil 80, a stop-off comb may be inserted into ejection apertures 110 before the coating is applied to prevent the coating from blocking the cooling passages 100. In other embodiments, shown as step 816, ejection apertures 110 may be formed after the coating is applied, e.g., by machining or another appropriate technique or process.

Method 800 is provided by way of example only; it will be appreciated that some steps or portions of method 800 may be performed in another order. Additionally, other methods of fabricating or forming airfoil 80 may be used as well. In particular, other processing cycles, e.g., utilizing other known methods or techniques for compacting CMC plies, may be used. Further, airfoil 80 may be post-processed using a melt infiltration process, a chemical vapor infiltration process, a matrix of pre-ceramic polymer fired to obtain a ceramic matrix, or any combinations of these or other known processes.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for forming an airfoil for a gas turbine engine, the method comprising:

laying up a ceramic matrix composite material to form an airfoil preform assembly, wherein the laying up the ceramic matrix composite material comprises laying up a plenum preform, laying up a filler pack preform, and laying up airfoil plies; the airfoil preform assembly including:

opposite pressure and suction sides extending radially along a span, opposite leading and trailing edges extending radially along the span, the pressure and suction sides extending axially between the leading and trailing edges, and a plenum defined within the airfoil preform assembly; and processing the airfoil preform assembly to produce the airfoil, wherein a cooling passage is defined within the airfoil, the cooling passage defined from the plenum to the trailing edge of the airfoil, the cooling passage defined proximate the suction side of the airfoil, the cooling passage comprising:

a first cavity extending radially within the trailing edge portion;

a second cavity defined aft of the first cavity, the second cavity extending radially within the trailing edge portion;

a crossover aperture defined from the plenum to the first cavity;

a channel defined from the first cavity to the second cavity, the channel extending axially between the first and second cavities; and an ejection aperture defined from the outer surface of the airfoil to the second cavity;

wherein each of the airfoil plies, the plenum plies, and the filler pack comprise a ceramic matrix composite material such that the airfoil is formed from the ceramic matrix composite material, and wherein the first cavity, the second cavity, and the channel are defined in the filler pack such that the first cavity, the second cavity, and the channel are separated from the outer surface by the airfoil plies.

2. The method of claim 1, wherein a fugitive material insert is positioned within the ceramic matrix composite material as the material is laid up to form the airfoil preform, the fugitive material insert configured to define the first cavity, the channel, and the second cavity.

3. The method of claim 1, wherein defining the cooling passage comprises machining the first cavity, the channel, and the second cavity within the filler pack preform before laying up the filler pack preform with the plenum preform and airfoil plies.

4. The method of claim 1, further comprising machining the ejection aperture after applying an environmental barrier coating to the airfoil.

5. The method of claim 1, wherein the ceramic matrix composite material comprises a plurality of airfoil plies, wherein the plurality of airfoil plies defining the pressure and suction sides of the airfoil preform assembly, and wherein the pressure and suction sides defining an outer surface of the airfoil preform assembly.

6. The method of claim 5, wherein the airfoil preform assembly further comprises a trailing edge portion defined adjacent the trailing edge at an aft end of the airfoil preform assembly, wherein the trailing edge portion extends axially over a length, wherein the ceramic matrix composite material comprises a plurality of plenum plies, wherein the plurality of plenum plies define the plenum, and wherein the plenum is defined within the airfoil preform assembly forward of the trailing edge portion.

7. The method of claim 6, wherein the ceramic matrix composite material further comprises a filler pack, the filler pack positioned between the plurality of airfoil plies and the plurality of plenum plies in the trailing edge portion, and wherein the first cavity, the second cavity, and the channel are defined in the filler pack such that the first cavity, the second cavity, and the channel are separated from the outer surface by the plurality of airfoil plies.

8. The method of claim 1, further comprising, after processing the airfoil preform assembly:

performing a burn-out cycle; and densifying the airfoil preform assembly.

9. The method of claim 8, further comprising:

positioning a fugitive material insert within the ceramic matrix composite material as the material is laid up to form the airfoil preform assembly, the fugitive material insert configured to define at least a portion of the cooling passage; and after performing the burn-out cycle and densifying the airfoil preform assembly, manipulating the airfoil to remove any remaining fugitive material of the fugitive material insert.

10. The method of claim 1, wherein at least a portion of the cooling passage is defined by machining the ceramic matrix composite material.

11. The method of claim 1, further comprising, prior to laying up the ceramic matrix composite material to form the airfoil preform assembly:

laying up a plurality of plenum plies to define a plenum preform;

compacting the plenum preform; and processing the plenum preform.

12. The method of claim 1, further comprising, prior to laying up the ceramic matrix composite material to form the airfoil preform assembly:

laying up a filler pack material to define a filler pack preform;

compacting the filler pack preform;

processing the filler pack preform to define a green state filler pack preform; and defining one or more voids in the green state filler pack preform, wherein the one or more voids define at least a portion of the cooling passage.

13. The method of claim 12, wherein defining one or more voids in the green state filler pack preform comprises machining the green state filler pack preform.

14. A method for forming an airfoil for a gas turbine engine, the method comprising:

forming a plenum preform from a ceramic matrix composite (CMC) material;

forming a filler pack preform from the CMC material;

preparing a plurality of airfoil plies, the plurality of airfoil plies formed from the CMC material;

laying up the plenum preform, the filler pack preform, and the plurality of airfoil plies to form an airfoil preform assembly, the airfoil preform assembly including opposite pressure and suction sides extending radially along a span, opposite leading and trailing edges extending radially along the span, the pressure and suction sides extending axially between the leading and trailing edges, the leading edge defining a forward end of the airfoil preform assembly, the trailing edge defining an aft end of the airfoil preform assembly, a trailing edge portion defined adjacent the trailing edge, the trailing edge portion extending axially over a length, and a plenum defined within the airfoil preform assembly forward of the trailing edge portion; and processing the airfoil preform assembly to produce the airfoil, wherein the pressure and suction sides define an outer surface of the airfoil, and wherein a cooling passage is defined within the airfoil, the cooling passage defined from the plenum to the trailing edge of the airfoil, the cooling passage defined proximate the suction side of the airfoil, the cooling passage comprising:

a first cavity extending radially within the trailing edge portion;

a second cavity defined aft of the first cavity, the second cavity extending radially within the trailing edge portion;

a crossover aperture defined from the plenum to the first cavity;

a channel defined from the first cavity to the second cavity, the channel extending axially between the first and second cavities; and an ejection aperture defined from the outer surface of the airfoil to the second cavity;

wherein each of the airfoil plies, the plenum plies, and the filler pack comprise a ceramic matrix composite material such that the airfoil is formed from the ceramic matrix composite material, and wherein the first cavity, the second cavity, and the channel are defined in the filler pack such that the first cavity, the second cavity, and the channel are separated from the outer surface by the airfoil plies.

15. The method of claim 14, wherein a channel that extends along a majority of the length of the trailing edge portion.

16. A method for forming an airfoil for a gas turbine engine, the method comprising:

laying up a plurality of airfoil plies, a plurality of plenum plies, and a filler pack to form an airfoil preform assembly, the airfoil preform assembly including opposite pressure and suction sides extending radially along a span, opposite leading and trailing edges extending radially along the span, the pressure and suction sides extending axially between the leading and trailing edges, the leading edge defining a forward end of the airfoil preform assembly, the trailing edge defining an aft end of the airfoil preform assembly, a trailing edge portion defined adjacent the trailing edge, the trailing edge portion extending axially over a length, and a plenum defined within the airfoil preform assembly forward of the trailing edge portion; and processing the airfoil preform assembly to produce the airfoil, wherein the plurality of airfoil plies, the plurality of plenum plies, and the filler pack are formed from a ceramic matrix composite (CMC) material, wherein the filler pack is positioned between the airfoil plies and the plenum plies in the trailing edge portion of the airfoil preform assembly, and wherein a plurality of cooling passages is defined within the airfoil, each cooling passage defined from the plenum to the trailing edge of the airfoil, and defined proximate the suction side of the airfoil, each cooling passage comprising:

a first cavity extending radially within the trailing edge portion;

a second cavity defined aft of the first cavity, the second cavity extending radially within the trailing edge portion;

a crossover aperture defined from the plenum to the first cavity;

a channel defined from the first cavity to the second cavity, the channel extending axially between the first and second cavities; and an ejection aperture defined from the outer surface of the airfoil to the second cavity;

wherein each of the airfoil plies, the plenum plies, and the filler pack comprise a ceramic matrix composite material such that the airfoil is formed from the ceramic matrix composite material, and wherein the first cavity, the second cavity, and the channel are defined in the filler pack such that the first cavity, the second cavity, and the channel are separated from the outer surface by the airfoil plies.

* * * * *